United States Patent
Nishio et al.

(10) Patent No.: US 11,654,888 B2
(45) Date of Patent: May 23, 2023

(54) CONTROL DEVICE OF VEHICLE

(71) Applicant: HONDA MOTOR CO., LTD., Tokyo (JP)

(72) Inventors: Yui Nishio, Saitama (JP); Kentaro Shiraki, Saitama (JP); Mamiko Inoue, Saitama (JP); Masatoshi Saito, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 17/200,362

(22) Filed: Mar. 12, 2021

(65) Prior Publication Data

US 2021/0291805 A1    Sep. 23, 2021

(30) Foreign Application Priority Data

Mar. 17, 2020   (JP) .............................. JP2020-046421

(51) Int. Cl.
    *B60W 20/20*    (2016.01)
    *B60W 20/13*    (2016.01)
    *B60K 6/442*    (2007.10)

(52) U.S. Cl.
    CPC ............. *B60W 20/20* (2013.01); *B60K 6/442* (2013.01); *B60Y 2200/92* (2013.01); *B60Y 2300/182* (2013.01)

(58) Field of Classification Search
    CPC .... B60W 20/20; B60K 6/442; B60Y 2200/92; B60Y 2300/182
    See application file for complete search history.

(56) References Cited

U.S. PATENT DOCUMENTS

| | | | | |
|---|---|---|---|---|
| 9,457,798 | B2 * | 10/2016 | Futatsudera | ........... B60W 10/26 |
| 9,849,870 | B2 * | 12/2017 | Morisaki | ................... B60L 3/12 |
| 2012/0245785 | A1 | 9/2012 | Tamagawa | |
| 2014/0025247 | A1 | 1/2014 | Tamagawa | |

(Continued)

FOREIGN PATENT DOCUMENTS

| | | |
|---|---|---|
| JP | 2014-196104 A | 10/2014 |
| WO | WO 2019/003443 A1 | 1/2019 |

OTHER PUBLICATIONS

JP2014196104 machine translation, pp. 1-13, filed Aug. 25, 2022. (Year: 2022).*

(Continued)

*Primary Examiner* — Tisha D Lewis
(74) *Attorney, Agent, or Firm* — Paratus Law Group, PLLC

(57) ABSTRACT

A control device of a vehicle that controls the vehicle capable of traveling according to a plurality of traveling modes including a first traveling mode and a second traveling mode. The control device includes a traveling mode control unit configured to cause the vehicle to travel according to any one of the plurality of traveling modes. The traveling mode control unit, when the traveling mode of the vehicle is set to the first traveling mode, shifts the traveling mode of the vehicle to the second traveling mode based on a detection result of a detection unit which detects an output of a power storage device and a transition threshold value. The traveling mode control unit includes a threshold value setting unit which changes a value of the transition threshold value in accordance with a maximum output of the power storage device.

7 Claims, 5 Drawing Sheets

(56) References Cited

U.S. PATENT DOCUMENTS

| | | |
|---|---|---|
| 2014/0249709 A1 | 9/2014 | Tamagawa |
| 2016/0214597 A1* | 7/2016 | Nanjo ................. B60K 7/0015 |
| 2017/0305292 A1* | 10/2017 | Minamiura ............ B60L 58/20 |
| 2018/0086333 A1* | 3/2018 | Oguma ................. B60W 20/20 |
| 2018/0086334 A1* | 3/2018 | Oguma ................. B60K 6/442 |
| 2020/0122712 A1 | 4/2020 | Miki et al. |

OTHER PUBLICATIONS

Nov. 24, 2021, Japanese Office Action issued for related JP Application No. 2020-046421.

\* cited by examiner

CONTROL DEVICE OF VEHICLE

CROSS-REFERENCE TO RELATED APPLICATIONS

This application is based upon and claims the benefit of priority from prior Japanese patent application No. 2020-046421, filed on Mar. 17, 2020, the entire contents of which are incorporated herein by reference.

TECHNICAL FIELD

The present invention relates to a control device of a vehicle.

BACKGROUND ART

In recent years, a hybrid electrical vehicle has a plurality of traveling modes including a hybrid traveling mode (also referred to as a series traveling mode) in which a generator generates electric power based on power of an engine in a state where a clutch is disengaged, and an electric motor outputs power at least based on the electric power supplied by the generator to drive a driving wheel, and an engine traveling mode in which the driving wheel is driven by at least power output by the engine in a state where the clutch is engaged (for example, see WO 2019/003443 below).

However, in WO 2019/003443, no consideration is given to a transition from the engine traveling mode to the series traveling mode, and there is room for improvement in this respect. For example, when a driving force of the vehicle decreases in accordance with the transition from the engine traveling mode to the series traveling mode, a so-called "slowness" occurs at the time of the transition, which may lead to a decrease in the merchantability of the vehicle.

SUMMARY OF INVENTION

An object of the present invention is to provide a control device of a vehicle capable of appropriately shifting a traveling mode from a first traveling mode, in which a vehicle can travel by power output from an internal combustion engine and power output from an electric motor in accordance with electric power supplied from an electric power storage device, to a second traveling mode, in which the vehicle can travel by power output from the electric motor in accordance with electric power supplied from a generator that generates electric power according to the power of the internal combustion engine.

According to an aspect of the present invention, there is provided a control device of a vehicle that controls the vehicle capable of traveling according to a plurality of traveling modes. The plurality of traveling modes includes a first traveling mode in which a driving wheel of the vehicle is capable of being driven by power output from an internal combustion engine and power output from an electric motor in accordance with electric power supplied from a power storage device and a second traveling mode in which the driving wheel is capable of being driven by the power output from the electric motor in accordance with electric power supplied from a generator that generates electric power using the power of the internal combustion engine. The control device of a vehicle includes a traveling mode control unit configured to cause the vehicle to travel according to any one of the plurality of traveling modes. The traveling mode control unit is configured to, when the traveling mode of the vehicle is set to the first traveling mode, shift the traveling mode of the vehicle to the second traveling mode based on a detection result of a detection unit configured to detect an output of the power storage device and a predetermined transition threshold value. The traveling mode control unit includes a threshold value setting unit configured to set the transition threshold value. The threshold value setting unit changes a value of the transition threshold value in accordance with a maximum output of the power storage device derived based on the output of the power storage device.

According to the present invention, it is possible to appropriately shift the traveling mode from the first traveling mode, in which the vehicle can travel by the power output from the internal combustion engine and the power output from the electric motor in accordance with the electric power supplied from the electric storage device, to the second traveling mode, in which the vehicle can travel by the power output from the electric motor in accordance with the electric power supplied from the generator that generates the electric power according to the power of the internal combustion engine.

DESCRIPTION OF EMBODIMENTS

Hereinafter, an embodiment of a control device of a vehicle according to the present invention will be described in detail with reference to the drawings.

Figure 1:
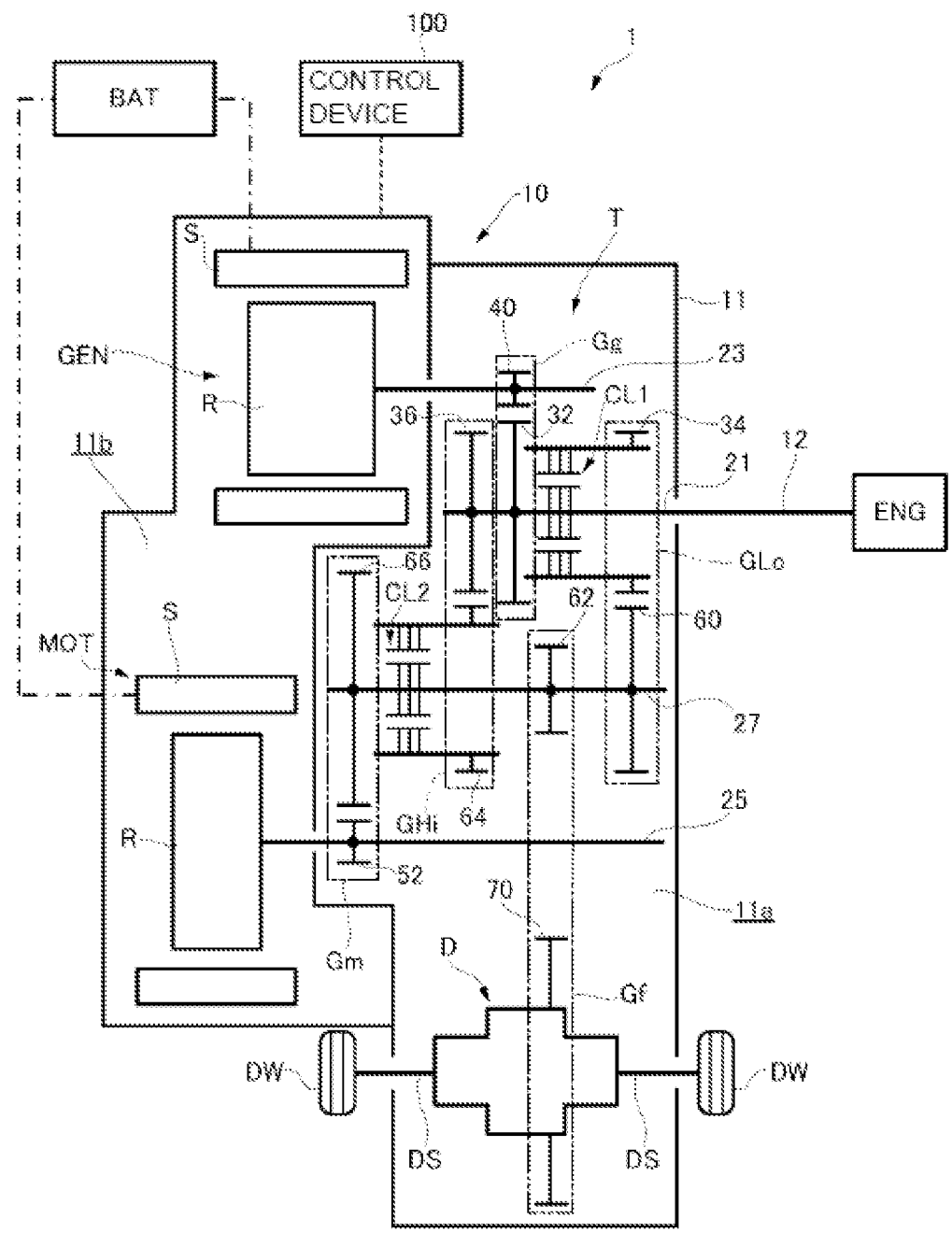
FIG. 1 is a diagram showing a schematic configuration of a vehicle including a control device of a vehicle according to an embodiment of the present invention.

First, a vehicle including the control device of a vehicle according to the present invention will be described with reference to FIG. 1. As shown in FIG. 1, a vehicle 1 of the present embodiment includes a driving device 10 that outputs a driving force of the vehicle 1, and a control device 100 that controls the entire vehicle 1 including the driving device 10.

[Driving Device]

As shown in FIG. 1, the driving device 10 includes an engine ENG, a generator GEN, a motor MOT, a transmission T, and a case 11 that accommodates the generator GEN, the motor MOT, and the transmission T. The motor MOT and the generator GEN are connected to a battery BAT included in the vehicle 1, which enables electric power supply from the battery BAT and energy regeneration to the battery BAT.

[Transmission]

The case 11 is provided with a transmission accommodating chamber 11*a* for accommodating the transmission T and a motor accommodating chamber 11*b* for accommodating the motor MOT and the generator GEN from the engine ENG side along an axial direction of the engine ENG.

The transmission accommodating chamber 11*a* accommodates an input shaft 21, a generator shaft 23, a motor shaft 25, a counter shaft 27, and a differential mechanism D arranged in parallel to each other.

The input shaft 21 is arranged coaxially with and adjacently to a crankshaft 12 of the engine ENG. A driving force of the crankshaft 12 is transmitted to the input shaft 21 via a damper (not shown). The input shaft 21 is provided with a generator drive gear 32 constituting a generator gear train Gg.

The input shaft 21 is provided with a low-speed side drive gear 34 constituting a low-speed side engine gear train GLo via a first clutch CL1 on the engine side with respect to the generator drive gear 32, and a high-speed side drive gear 36 constituting a high-speed side engine gear train GHi on a side opposite to the engine side (hereinafter, referred to as a motor side). The first clutch CL1 is a hydraulic clutch for detachably connecting the input shaft 21 and the low-speed side drive gear 34, and is a so-called multi-plate friction type clutch.

The generator shaft 23 is provided with a generator driven gear 40 that meshes with the generator drive gear 32 of the input shaft 21. The generator drive gear 32 of the input shaft 21 and the generator driven gear 40 of the generator shaft 23 constitute a generator gear train Gg for transmitting a rotation of the input shaft 21 to the generator shaft 23. The generator GEN is arranged on the motor side of the generator shaft 23. The generator GEN includes a rotor R fixed to the generator shaft 23 and a stator S fixed to the case 11 and arranged to face an outer diameter side of the rotor R.

When the rotation of the input shaft 21 is transmitted to the generator shaft 23 via the generator gear train Gg, the rotor R of the generator GEN rotates due to the rotation of the generator shaft 23. Accordingly, when the engine ENG is driven, power of the engine ENG input from the input shaft 21 can be converted into electric power by the generator GEN.

The motor shaft 25 is provided with a motor drive gear 52 constituting a motor gear train Gm. The motor MOT is arranged on the motor shaft 25 closer to the motor accommodating chamber 11b side than the motor drive gear 52. The motor MOT includes a rotor R fixed to the motor shaft 25 and a stator S fixed to the case 11 and arranged to face an outer diameter side of the rotor R.

The counter shaft 27 is provided with, in an order from the engine side, a low-speed side driven gear 60 meshing with the low-speed side drive gear 34, an output gear 62 meshing with a ring gear 70 of the differential mechanism D, a high-speed side driven gear 64 meshing with the high-speed side drive gear 36 of the input shaft 21 via a second clutch CL2, and a motor driven gear 66 meshing with the motor drive gear 52 of the motor shaft 25. The second clutch CL2 is a hydraulic clutch for detachably connecting the counter shaft 27 and the high-speed side driven gear 64, and is a so-called multi-plate friction type clutch.

The low-speed side drive gear 34 of the input shaft 21 and the low-speed side driven gear 60 of the counter shaft 27 constitute a low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute a high-speed side engine gear train GHi for transmitting the rotation of the input shaft 21 to the counter shaft 27. Here, the low-speed side engine gear train GLo including the low-speed side drive gear 34 and the low-speed side driven gear 60 has a higher reduction ratio than the high-speed side engine gear train GHi including the high-speed side drive gear 36 and the high-speed side driven gear 64.

Therefore, when the first clutch CL1 is engaged and the second clutch CL2 is disengaged at the time of driving the engine ENG, the driving force of the engine ENG is transmitted to the counter shaft 27 via the low-speed side engine gear train GLo at a high reduction ratio. Meanwhile, when the first clutch CL1 is disengaged and the second clutch CL2 is engaged at the time of driving the engine ENG, the driving force of the engine ENG is transmitted to the counter shaft 27 via the high-speed side engine gear train GHi at a low reduction ratio. Note that the first clutch CL1 and the second clutch CL2 are not engaged at the same time.

The motor drive gear 52 of the motor shaft 25 and the motor driven gear 66 of the counter shaft 27 constitute the motor gear train Gm for transmitting the rotation of the motor shaft 25 to the counter shaft 27. When the rotor R of the motor MOT is rotated, the rotation of the motor shaft 25 is transmitted to the counter shaft 27 via the motor gear train Gm. Accordingly, when the motor MOT is driven, the driving force of the motor MOT is transmitted to the counter shaft 27 via the motor gear train Gm.

The output gear 62 of the counter shaft 27 and the ring gear 70 of the differential mechanism D constitute a final gear train Gf for transmitting a rotation of the counter shaft 27 to the differential mechanism D. Therefore, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for the vehicle 1 to travel is output via a pair of driving wheels DW provided at both ends of the axle DS.

The driving device 10 configured as described above has a power transmission path for transmitting the driving force of the motor MOT to the axle DS (that is, the driving wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the driving device 10 can take a plurality of traveling modes such as an EV traveling mode or a hybrid traveling mode in which the vehicle travels by power output from the motor MOT, and a low-speed side engine traveling mode or a high-speed side engine traveling mode in which the vehicle travels by power output from the engine ENG.

The control device 100 acquires vehicle information related to the vehicle 1 based on detection signals received from various sensors included in the vehicle 1, and controls the driving device 10 based on the acquired vehicle information.

Here, the vehicle information includes information indicating a traveling state of the vehicle 1. The information indicating the traveling state of the vehicle 1 includes, for example, information indicating a speed of the vehicle 1 (hereinafter, also referred to as a vehicle speed), an AP opening degree indicating an operation amount (that is, an accelerator position) with respect to an accelerator pedal provided in the vehicle 1, a required driving force of the vehicle 1 derived based on the vehicle speed, the AP opening and the like, a rotational speed of the engine ENG (hereinafter referred to as "the engine rotational speed"), and the like. In addition, the vehicle information further includes battery information related to the battery BAT included in the vehicle 1. The battery information includes, for example, information indicating an output voltage (inter-terminal voltage) of the battery BAT, a charge and discharge current of the battery BAT, a temperature of the battery BAT, a state of charge (SOC) of the battery BAT derived based on the inter-terminal voltage, the charge and discharge current, and the like, a required electric power required for the battery BAT, and the like. Hereinafter, the SOC of the battery BAT is also referred to as a battery SOC.

The control device 100 controls the driving device 10 based on the vehicle information to cause the vehicle 1 to travel in any of the plurality of traveling modes that the vehicle 1 can take. In the control of the driving device 10, for example, the control device 100 controls the output of power from the engine ENG by controlling the supply of fuel to the engine ENG, controls the output of power from the motor MOT by controlling the supply of electric power to the motor MOT, and controls the generation of power (for example, output voltage) of the generator GEN by controlling a field current or the like flowing through a coil of the generator GEN.

In the control of the driving device 10, the control device 100 controls the first clutch CL1 to be disengaged or engaged by controlling an actuator (not shown) that operates the first clutch CL1. Similarly, the control device 100 controls the second clutch CL2 to be disengaged or engaged by controlling an actuator (not shown) that operates the second clutch CL2.

In this way, by controlling the engine ENG, the generator GEN, the motor MOT, the first clutch CL1 and the second clutch CL2, the control device 100 can cause the vehicle 1 to travel in any of the plurality of traveling modes that the vehicle 1 can take. The control device 100 is an example of the control device of a vehicle according to the present invention, and is realized by an electronic control unit (ECU) including a processor, a memory, an interface, and the like, for example.

[Traveling Mode that Vehicle can Take]

Figure 2:
FIG. 2 is a diagram showing the contents of each traveling mode.

Next, a traveling mode that the vehicle 1 can take will be described with reference to a traveling mode table Ta shown in FIG. 2. As shown in FIG. 2, the vehicle 1 can take the plurality of traveling modes including the EV traveling mode, the hybrid traveling mode, the low-speed side engine traveling mode, and the high-speed side engine traveling mode.

[EV Traveling Mode]

The EV traveling mode is a traveling mode in which electric power is supplied to the motor MOT from the battery BAT, and the vehicle 1 is driven by the power output from the motor MOT in accordance with the electric power. In the EV traveling mode, the engine ENG is stopped.

Specifically, in the EV traveling mode, the control device 100 controls both the first clutch CL1 and the second clutch CL2 to be disengaged. In the EV traveling mode, the control device 100 performs a control such that injection of fuel to the engine ENG is stopped (so-called fuel cut), and the output of the power from the engine ENG is stopped. In the EV traveling mode, the control device 100 performs a control such that electric power is supplied to the motor MOT from the battery BAT, and power corresponding to the electric power is output to the motor MOT (shown as motor: "driven by battery"). As a result, in the EV traveling mode, the motor MOT outputs power according to the electric power supplied from the battery BAT, and the vehicle 1 travels by the output power.

In the EV traveling mode, as described above, the output of the power from the engine ENG is stopped, and both the first clutch CL1 and the second clutch CL2 are disengaged. Therefore, in the EV traveling mode, no power is input to the generator GEN, and the generator GEN does not generate power (shown as generator: "stop power generation"). In addition, the transition between the EV traveling mode and the hybrid traveling mode can be easily and quickly performed because a clutch state is not changed. Meanwhile, the transition from the EV traveling mode to the engine traveling mode changes from a disengaged state to a connected state of the clutch, so that it takes time and a temporary decrease in the driving force may occur.

[Hybrid Traveling Mode]

The hybrid traveling mode is an example of a second traveling mode in the present invention, and is a traveling mode in which electric power is supplied to the motor MOT at least from the generator GEN, and the vehicle 1 travels by the power output from the motor MOT in accordance with the electric power.

Specifically, in the case of the hybrid traveling mode, the control device 100 controls both the first clutch CL1 and the second clutch CL2 to be disengaged. In the case of the hybrid traveling mode, the control device 100 causes fuel to inject to the engine ENG to output power from the engine ENG. The power output from the engine ENG is input to the generator GEN via the generator gear train Gg. As a result, power generation by the generator GEN is performed.

In a case of the hybrid traveling mode, the control device 100 performs a control such that the electric power generated by the generator GEN is supplied to the motor MOT, and power corresponding to the electric power is output to the motor MOT (shown as motor: "driven by generator"). The electric power supplied from the generator GEN to the motor MOT is greater than the electric power supplied from the battery BAT to the motor MOT. Therefore, in the hybrid traveling mode, the power output from the motor MOT (driving force of the motor MOT) can be increased as compared with the EV traveling mode, and a great driving force can be obtained as the driving force of the vehicle 1.

In the case of the hybrid traveling mode, the control device 100 may perform a control such that the electric power output from the battery BAT is supplied from the battery BAT to the motor MOT if necessary. That is, in the hybrid traveling mode, the control device 100 may perform a control such that the electric power is supplied from both the generator GEN and the battery BAT to the motor MOT. As a result, the electric power supplied to the motor MOT can be increased as compared with a case where the electric power is supplied to the motor MOT only from the generator GEN. As a result, the power output from the motor MOT can be increased, and a greater driving force can be obtained as the driving force of the vehicle 1.

[Low-Speed Side Engine Traveling Mode]

The low-speed side engine traveling mode is an example of a first traveling mode in the present invention, and is a traveling mode in which the power output from the engine ENG is transmitted to the driving wheels DW via the low-speed side power transmission path to drive the vehicle 1.

Specifically, in the case of the low-speed side engine traveling mode, the control device 100 perform a control such that fuel is injected to the engine ENG and power is output from the engine ENG. In addition, in the case of the low-speed side engine traveling mode, the control device 100 controls the first clutch CL1 to be engaged and the second clutch CL2 to be disengaged. Therefore, in the low-speed side engine traveling mode, the power output from the engine ENG is transmitted to the driving wheels DW via the low-speed side engine gear train GLo, the final gear train Gf, and the differential mechanism D to drive the vehicle 1.

In the case of the low-speed side engine traveling mode, the power output from the engine ENG is also input to the generator GEN via the generator gear train Gg, but the generator GEN is controlled so as not to generate power. For example, in the low-speed side engine traveling mode, a switching element (for example, a switching element of an inverter device provided between the generator GEN and the battery BAT) provided in an electric power transmission path between the generator GEN and the battery BAT is turned off so that the generator GEN is controlled so as not to generate power. Accordingly, in the low-speed side engine traveling mode, loss caused by power generation of the generator GEN can be reduced, and an amount of heat generated by the generator GEN or the like can be reduced. In the low-speed side engine traveling mode, during braking of the vehicle 1, the motor MOT may be used as a generator to perform regenerative power generation by the motor MOT, and the battery BAT may be charged with the generated electric power.

In the case of the low-speed side engine traveling mode, for example, the control device 100 stops the supply of electric power to the motor MOT, and stops the output of the power from the motor MOT As a result, in the low-speed side engine traveling mode, a load on the motor MOT can be reduced, and an amount of heat generated by the motor MOT can be reduced.

In the case of the low-speed side engine traveling mode, the control device 100 may perform a control such that the electric power is supplied from the battery BAT to the motor MOT if necessary. Therefore, in the low-speed side engine traveling mode, the vehicle 1 can travel using the power output from the motor MOT based on the electric power supplied from the battery BAT, and as compared with the case where the vehicle 1 travels by only the power of the engine ENG, a greater driving force can be obtained as the driving force of the vehicle 1. In the present embodiment, traveling the vehicle 1 not only using the power of the engine ENG but also using the power output from the motor MOT by the electric power supplied from the battery BAT is also referred to as traveling by motor assist.

[High-Speed Side Engine Traveling Mode]

The high-speed side engine traveling mode is a traveling mode in which the power output from the engine ENG is transmitted to the driving wheels DW via the high-speed side power transmission path to drive the vehicle 1.

Specifically, in the case of the high-speed side engine traveling mode, the control device 100 performs a control such that fuel is injected to the engine ENG and power is output from the engine ENG. In addition, in the case of the high-speed side engine traveling mode, the control device 100 controls the second clutch CL2 to be engaged and the first clutch CL1 to be disengaged. Thus, in the high-speed side engine traveling mode, the power output from the engine ENG is transmitted to the driving wheels DW via the high-speed side engine gear train GHi, the final gear train Gf, and the differential mechanism D to drive the vehicle 1.

In the case of the high-speed side engine traveling mode, the power output from the engine ENG is also input to the generator GEN via the generator gear train Gg, but the generator GEN is controlled so as not to generate power. As a result, in the high-speed side engine traveling mode, the loss caused by the power generation of the generator GEN can be reduced, and the amount of heat generated by the generator GEN or the like can be reduced. In the high-speed side engine traveling mode, during the braking of the vehicle 1, the motor MOT may be used as a generator to perform the regenerative power generation by the motor MOT, and the battery BAT may be charged with the generated electric power.

In the case of the high-speed side engine traveling mode, for example, the control device 100 stops the supply of the electric power to the motor MOT, and stops the output of the power from the motor MOT. As a result, in the high-speed side engine traveling mode, the load on the motor MOT can be reduced, and the amount of heat generated by the motor MOT can be reduced.

In the case of the high-speed side engine traveling mode, the control device 100 may perform a control such that the electric power is supplied from the battery BAT to the motor MOT if necessary. Therefore, in the high-speed side engine traveling mode, the vehicle 1 can travel using the power output from the motor MOT by the electric power supplied from the battery BAT, and as compared with the case where the vehicle 1 travels by only the power of the engine ENG, a greater driving force can be obtained as the driving force of the vehicle 1. In the high-speed side engine traveling mode, traveling the vehicle 1 not only using the power of the engine ENG but also using the power output from the motor MOT by the electric power supplied from the battery BAT is also referred to as the traveling by motor assist.

In the transition from the hybrid traveling mode to the engine traveling mode, the clutch CL changes from the disengaged state to the connected state. Therefore, during the transition from the hybrid traveling mode to the engine traveling mode, a predetermined control such as matching the rotational speed of the engine ENG and a rotational speed of the axle DS is required, which takes time and may cause a temporary decrease in the driving force.

[Functional Configuration of Control Device]

Figure 3:
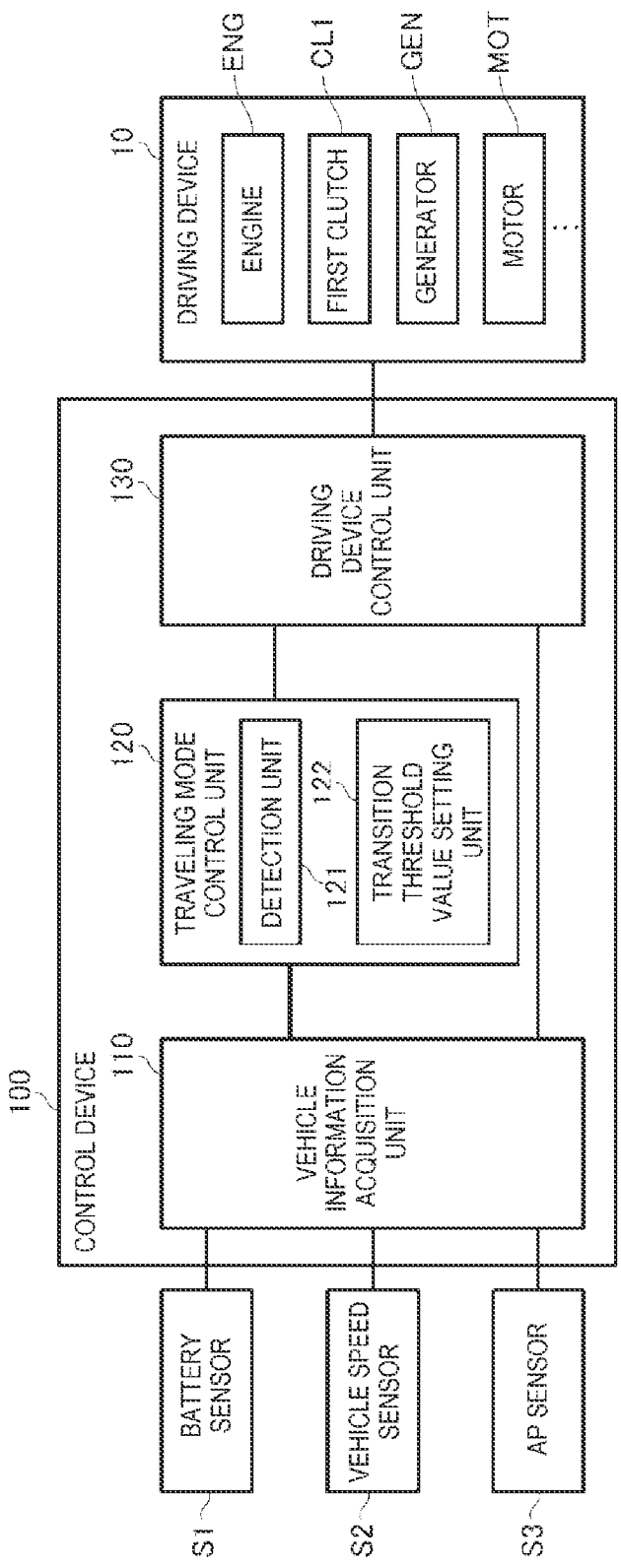
FIG. 3 is a block diagram showing a functional configuration of the control device.

Next, a functional configuration of the control device 100 will be described with reference to FIGS. 3 and 4. As shown in FIG. 3, the control device 100 includes a vehicle information acquisition unit 110, a traveling mode control unit 120 that controls the traveling mode, and a driving device control unit 130 that controls the driving device 10. For example, the vehicle information acquisition unit 110, the traveling mode control unit 120, and the driving device control unit 130 can realize the functions thereof by executing programs stored in a memory by a processor of the ECU that implements the control device 100, or by an interface of the ECU.

The vehicle information acquisition unit 110 acquires vehicle information (traveling state, battery information, or the like) related to the vehicle 1 based on detection signals received from various sensors included in the vehicle 1 to the control device 100. The vehicle information acquisition unit 110 transmits the acquired vehicle information to the traveling mode control unit 120 and the driving device control unit 130. The vehicle information acquired by the vehicle information acquisition unit 110 includes, for example, information indicating the traveling state of the vehicle 1 such as the vehicle speed, the AP opening degree, the engine rotational speed, and the like, and battery information of the vehicle 1 such as a voltage between battery terminals, the charge and discharge current of the battery, the battery temperature, and the like.

The battery information can be acquired, for example, based on a detection signal from a battery sensor S1 that detects a state of the battery BAT The battery sensor S1 detects the inter-terminal voltage, the charge and discharge current, the temperature, and the like of the battery BAT, and transmits a detection signal indicating these to the control device 100.

The vehicle speed can be acquired, for example, based on a detection signal from a vehicle speed sensor S2 that detects the rotational speed of the axle DS. The AP opening degree can be acquired based on a detection signal from an accelerator position sensor (shown as AP sensor) S3 that detects an operation amount with respect to an accelerator pedal provided in the vehicle 1. The required driving force can be acquired by deriving the driving force based on the vehicle speed acquired based on the detection signal from the vehicle speed sensor S2 or the AP opening degree acquired based on the detection signal from the AP sensor S3.

The traveling mode control unit 120 sets one of a plurality of traveling modes that the vehicle 1 can take, and transmits a mode signal notifying the set traveling mode to the driving device control unit 130. For example, information indicating a setting condition of each traveling mode is stored in advance in the control device 100. Here, the information indicating the setting condition of each traveling mode is, for example, information in which the traveling state of the vehicle 1 and the traveling mode (that is, the traveling mode to be set) suitable for the traveling state are associated with each other.

The traveling mode control unit 120 includes a detection unit 121 that can derive various types of information necessary for a control of the traveling mode based on the vehicle information acquired by the vehicle information acquisition unit 110. The detection unit 121 derives the required driving force required by the motor MOT, for example, based on the vehicle speed, the AP opening degree, and the like acquired by the vehicle information acquisition unit 110. In addition, for example, the detection unit 121 derives the required electric power required by the motor MOT for the battery BAT based on the inter-terminal voltage and the output (discharge) current of the battery BAT acquired by the vehicle information acquisition unit 110.

For example, the detection unit 121 derives the battery SOC based on the inter-terminal voltage, the charge and discharge current, a discharge and charge time, the battery temperature, and the like of the battery BAT acquired by the vehicle information acquisition unit 110. Further, the detection unit 121 derives the maximum output electric power that can be output from the battery BAT based on the derived battery SOC. For example, the detection unit 121 can derive the maximum output electric power based on the battery SOC with reference to a predetermined map representing a relationship between the battery SOC and the maximum output electric power. In addition, in order to derive the maximum output electric power, the battery temperature acquired by the vehicle information acquisition unit 110 may also be used.

The maximum driving force of the vehicle 1 in the low-speed side engine traveling mode becomes power obtained by adding the power of the engine ENG and the power output from the motor MOT in accordance with the electric power from the battery BAT. Therefore, when the maximum output electric power of the battery BAT decreases, output power of the motor MOT decreases, and the maximum driving force of the vehicle 1 decreases. In addition, since there is a correlation between the maximum output electric power of the battery BAT and the battery SOC, when the battery SOC decreases, the maximum output electric power of the battery BAT also decreases.

Figure 4:
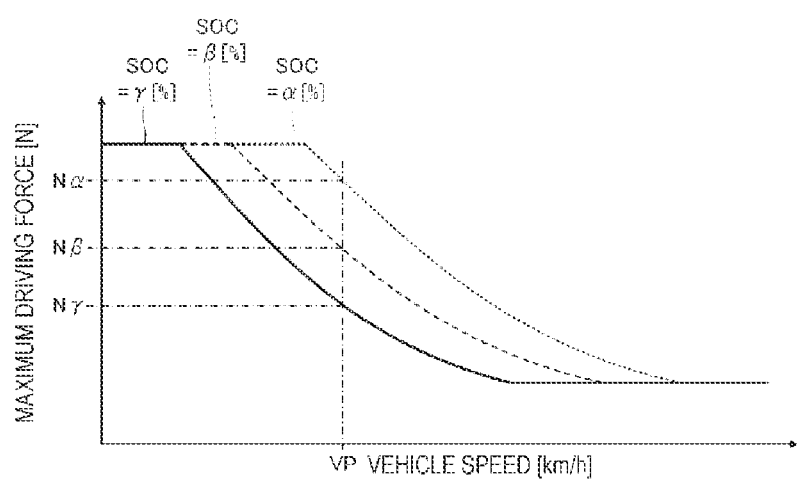
FIG. 4 is a diagram showing a relationship between a vehicle speed, an SOC and a maximum driving force of the vehicle.

For example, as shown in FIG. 4, in the low-speed side engine traveling mode, the maximum driving force that can be output by the vehicle 1 changes depending on the vehicle speed and the battery SOC. The SOC [%] of the battery in FIG. 4 is $\alpha>\beta>\gamma$. In a case where the vehicle speed is VP, the maximum driving force when SOC=$\alpha$ is N$\alpha$, the maximum driving force when SOC=$\beta$ is N$\beta$, and the maximum driving force when SOC=$\gamma$ is N$\gamma$, and N$\alpha$>N$\beta$>N$\gamma$. That is, when the battery SOC decreases, the maximum output electric power of the battery BAT decreases, and the maximum driving force of the vehicle 1 also decreases by an amount that the output power of the motor MOT decreases. Here, an example of the low-speed side engine traveling mode in which the above-described problem is likely to appear remarkably has been described, but the same problem may occur even in the high-speed side engine traveling mode.

As shown in FIG. 3, the traveling mode control unit 120 includes a transition threshold value setting unit 122 for setting a transition threshold value as a condition for shifting the traveling mode. The transition threshold value setting unit 122 sets the transition threshold value for shifting the traveling mode from the engine traveling mode to the hybrid traveling mode, for example, based on the derived maximum output electric power of the battery BAT. The transition threshold value is stored in, for example, a transition threshold value table (not shown) included in the traveling mode control unit 120. The transition threshold value is stored in advance in the transition threshold value table in association with each maximum output electric power that can be output by the battery BAT.

In this case, the transition threshold value is an electric power value [kW] that is compared with the required electric power required by the motor MOT for the battery BAT in the engine traveling mode. Specifically, the transition threshold value is a comparative electric power value that enables the required electric power to be appropriately supplied (for example, without slowness) even when the traveling mode is shifted by shifting the traveling mode to the hybrid traveling mode when the required electric power exceeds the transition threshold value even in a case where the required electric power required by the motor MOT for the battery BAT increases. The transition threshold value is set to at least a value smaller than the maximum output electric power that can be output by the battery BAT. In addition, the transition threshold value is set to a relatively great value when the maximum output electric power of the battery BAT is relatively great, and is set to a relatively small value when the maximum output electric power of the battery BAT is relatively small.

The driving device control unit 130 controls the driving device 10 based on the traveling mode set by the traveling mode control unit 120, the vehicle information acquired by the vehicle information acquisition unit 110, and the like. For example, when the driving device control unit 130 receives a mode signal for shifting from the low-speed side engine traveling mode to the hybrid traveling mode from the traveling mode control unit 120, the driving device control unit 130 causes the first clutch CL1 to be disengaged and the generator GEN to input the power output from the engine ENG to start power generation of the generator GEN. Then, by supplying the electric power generated by the generator GEN to the motor MOT, the traveling mode is shifted to the hybrid traveling mode in which the vehicle 1 travels using the power output from the motor MOT in accordance with the generated electric power of the generator GEN.

[Control of Traveling Mode]

Next, a processing procedure of the control device 100 for shifting the traveling mode of the vehicle 1 will be described with reference to FIG. 5.

Figure 5:
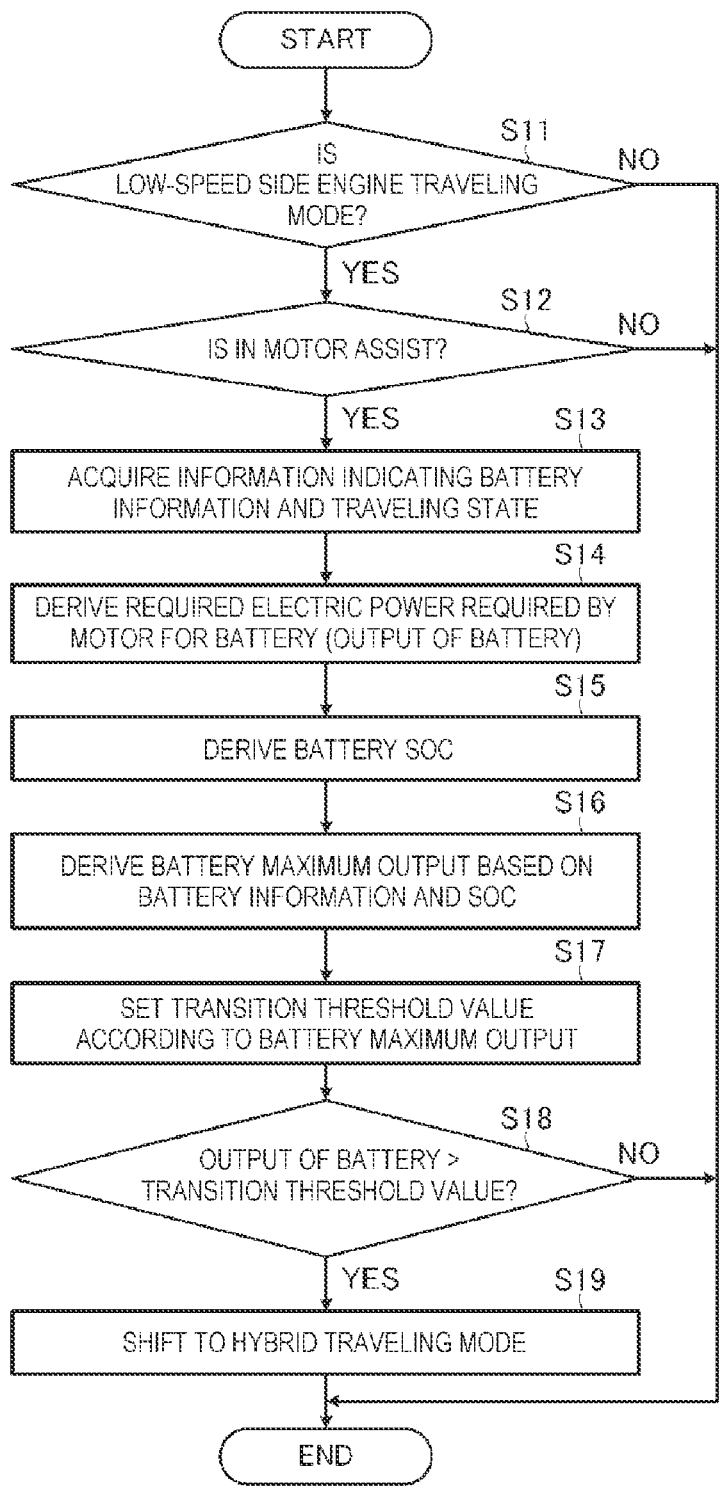
FIG. 5 is a flowchart for illustrating an operation of the control device.

As shown in FIG. 5, first, the traveling mode control unit 120 of the control device 100 determines whether the current traveling mode of the vehicle 1 is the low-speed side engine traveling mode (step S11).

In step S11, in a case where it is determined that the traveling mode of the vehicle 1 is the low-speed side engine traveling mode (step S11: Yes), the traveling mode control unit 120 determines whether the low-speed side engine traveling mode is in the motor assistance (step S12). As described above, the motor assist refers to a state in which the vehicle is traveling using not only the power of the engine ENG but also the power output from the motor MOT by the electric power supplied from the battery BAT.

On the other hand, in step S1, in a case where it is determined that the traveling mode of the vehicle 1 is not the low-speed side engine traveling mode (step S1: No), the traveling mode control unit 120 ends the present transition processing.

Subsequently, in step S12, in a case where it is determined that the low-speed side engine traveling mode is in the motor assistance (step S12: Yes), the vehicle information acquisition unit 110 of the control device 100 acquires the battery information including the voltage between the battery terminals, the charge and discharge current of the battery, the battery temperature, and the like from the battery sensor S1, and the information indicating the traveling state of the vehicle 1 including the vehicle speed, the AP opening degree, and the like from the vehicle speed sensor S2 and the AP sensor S3 (step S13).

On the other hand, in step S12, in a case where it is determined that the low-speed side engine traveling mode is not in the motor assistance (step S12: No), the traveling mode control unit 120 ends the present transition processing.

Subsequently, the detection unit 121 of the traveling mode control unit 120 derives the required electric power required by the motor MOT for the battery BAT based on the inter-terminal voltage and the output (discharge) current of the battery BAT acquired by the vehicle information acquisition unit 110 in step S13 (step S14). In the present processing procedure, the required electric power required by the motor MOT for the battery BAT is hereinafter referred to as a "battery output" in the meaning of electric power that the battery BAT actually outputs to the motor MOT.

Subsequently, the detection unit 121 derives the battery SOC based on the inter-terminal voltage, the discharge and charge time, and the battery temperature of the battery BAT acquired by the vehicle information acquisition unit 110 in step S13 (step S15).

The detection unit 121 derives the maximum output electric power that can be output by the current battery BAT based on the battery temperature acquired in step S13 and the battery SOC derived in step S15 (step S16).

Subsequently, the transition threshold value setting unit 122 of the traveling mode control unit 120 sets a transition threshold value for shifting the traveling mode from the engine traveling mode to the hybrid traveling mode based on the maximum output electric power that can be output from the battery BAT, which is derived in step S16 (step S17). The transition threshold value setting unit 122 sets the transition threshold value with reference to the transition threshold value table.

The traveling mode control unit 120 compares the battery output derived in step S14 with the transition threshold value set in step S17, and determines whether the battery output is greater than the transition threshold value (step S18).

In step S18, in a case where it is determined that the battery output is greater than the transition threshold value (step S18: Yes), the traveling mode control unit 120 cancels the low-speed side engine traveling mode and shifts the traveling mode to the hybrid traveling mode (step S19).

On the other hand, in a case where it is determined in step S18 that the battery output is equal to or less than the transition threshold value (step S18: No), the traveling mode control unit 120 ends the present transition processing.

The control of the traveling mode according to the procedure described above is repeatedly executed at a predetermined cycle in a period in which the traveling mode of the vehicle 1 is set to the low-speed side engine traveling mode. In a situation in which the above-described control of the processing procedure is executed, for example, a situation in which the vehicle 1 is traveling at a high load, such as a case in which the vehicle 1 travels on a slope while towing a trailer, can be exemplified.

As described above, according to the control device 100, the transition threshold value, which is a transition condition from the low-speed side engine traveling mode to the hybrid traveling mode, can be changed in accordance with the maximum output electric power of the battery BAT that is derived based on the battery SOC, and the traveling mode can be shifted to the hybrid traveling mode based on the required electric power (the battery output) required by the motor MOT for the battery BAT and the transition threshold value. As a result, in a situation where the driving force of the vehicle 1 can significantly decrease when the output of the battery BAT decreases, the traveling mode of the vehicle 1 can be appropriately shifted to the hybrid traveling mode.

In the low-speed side engine traveling mode during the motor assistance in which the power of the motor MOT is added to the power of the engine ENG, when the power required for the motor MOT increases, the SOC of the battery BAT decreases, so that the maximum output electric power of the battery BAT decreases. For example, in the case where the traveling mode is shifted from the low-speed side engine traveling mode to the hybrid traveling mode after the maximum output electric power of the battery BAT decreases, the "slowness" associated with the decrease in the driving force may occur when the traveling mode is shifted. In order to prevent such a phenomenon from occurring, the transition threshold value, which is a transition condition for shifting from the low-speed side engine traveling mode to the hybrid traveling mode, may be set as low as possible. However, on the other hand, from the viewpoint of fuel efficiency of the vehicle 1 and a heat resistance performance due to heat generation of the generator GEN during the hybrid traveling mode, it is desired to maintain the traveling in the low-speed side engine traveling mode for a long time. For this purpose, the transition threshold value, which is the transition condition of the traveling mode, may be set as high as possible.

According to the control device 100 of the present invention, the transition threshold value can be changed in accordance with the maximum output electric power of the battery BAT derived based on the battery SOC, and in the case where the battery output exceeds the transition threshold value, the traveling mode can be shifted to the hybrid traveling mode. Accordingly, it is possible to suppress a decrease in the fuel efficiency, maintain the heat resistance performance, and appropriately perform the transition from the low-speed side engine traveling mode to the hybrid traveling mode without generating the "slowness" associated with the decrease in the driving force when the traveling mode is shifted.

According to the control device 100, in the low-speed side engine traveling mode, an acceleration force of the vehicle 1 can be maintained by shifting the traveling mode to the hybrid traveling mode in the case where the battery output exceeds the transition threshold value. That is, the vehicle 1 can be accelerated by increasing the power of the motor MOT based on the electric power of the generator GEN. Further, the power output from the motor MOT depends on the electric power supplied from the generator GEN. Therefore, when the low-speed side engine traveling mode is set, the electric power required by the motor MOT for the battery BAT increases, and in the case where the battery output exceeds the transition threshold value, the traveling mode is shifted to the hybrid traveling mode, and the electric power generated by the generator GEN is supplied to the motor MOT, so that the power output from the motor MOT can be increased, and the acceleration force of the vehicle 1 can be maintained.

According to the control device 100, when the maximum output electric power of the battery BAT is relatively great, the transition threshold value is set to the relatively great value, and when the maximum output electric power of the battery BAT is relatively small, the transition threshold value is set to the relatively small value. Therefore, in a situation where a sufficient output electric power is obtained from the battery BAT, it is possible to increase an opportunity to cause the vehicle 1 to travel in the low-speed side engine traveling mode, which is preferable from the viewpoint of the fuel efficiency and heat resistance performance.

Although the embodiment of the present invention have been described above, the present invention is not limited to the above embodiment, and modifications, improvements, and the like can be made as appropriate.

For example, in the embodiment described above, an example in which the transition threshold value, which is the transition condition from the low-speed side engine traveling mode to the hybrid traveling mode, is changed in accordance with the maximum output electric power of the battery BAT derived based on the battery SOC has been described, but the present invention is not limited thereto. In the same manner as described above, the transition threshold value, which is the transition condition from the high-speed side engine traveling mode to the hybrid traveling mode, may be changed in accordance with the maximum output electric power of the battery BAT derived based on the battery SOC.

At least the following matters are described in the present specification. Although the corresponding constituent elements or the like in the above embodiment are shown in parentheses, the present invention is not limited thereto.

(1) A control device (control device 100) of a vehicle that controls the vehicle capable of traveling according to a plurality of traveling modes,
the plurality of traveling modes including:
a first traveling mode (low-speed side engine travel mode) in which a driving wheel (driving wheel DW) of the vehicle (vehicle 1) is capable of being driven by power output from an internal combustion engine (engine ENG) and power output from an electric motor (motor MOT) in accordance with electric power supplied from a power storage device (battery BAT); and
a second traveling mode (hybrid traveling mode) in which the driving wheel is capable of being driven by the power output from the electric motor in accordance with electric power supplied from a generator (generator GEN) that generates electric power using the power of the internal combustion engine,
the control device of a vehicle including:

a traveling mode control unit (traveling mode control unit 120) configured to cause the vehicle to travel according to any one of the plurality of traveling modes,
wherein the traveling mode control unit is configured to, when the traveling mode of the vehicle is set to the first traveling mode, shift the traveling mode of the vehicle to the second traveling mode based on a detection result of a detection unit (detection unit 121) configured to detect an output of the power storage device and a predetermined transition threshold value, and includes a threshold value setting unit (transition threshold value setting unit 122) configured to set the transition threshold value, and
wherein the threshold value setting unit changes a value of the transition threshold value in accordance with a maximum output of the power storage device derived based on the output of the power storage device.

According to (1), the transition threshold value, which is the transition condition from the first traveling mode to the second traveling mode, can be changed in accordance with the maximum output of the power storage device derived based on the output of the power storage device, and the traveling mode can be shifted to the second traveling mode based on the detection result of the output of the power storage device and the transition threshold value. This makes it possible to appropriately shift the traveling mode from the first traveling mode to the second traveling mode.

(2) The control device of a vehicle according to (1), wherein the traveling mode control unit is configured to, when the traveling mode of the vehicle is set to the first traveling mode, shift the traveling mode of the vehicle to the second traveling mode in a case where the output of the power storage device exceeds the transition threshold value set by the threshold value setting unit.

According to (2), when the vehicle is in the first traveling mode, the traveling mode is shifted to the second traveling mode in the case where the output of the power storage device exceeds the transition threshold value, so that the acceleration force of the vehicle can be maintained. That is, the vehicle can be accelerated by increasing the power output from the electric motor. Further, the power output from the electric motor depends on the electric power supplied to the electric motor. Therefore, when the first traveling mode is set, the electric power required by the electric motor for the power storage device increases, and in the case where the output of the power storage device exceeds the transition threshold value, the traveling mode is shifted to the second traveling mode, and the electric power generated by the generator is supplied to the electric motor, so that the power output from the electric motor can be increased, and the acceleration force of the vehicle can be maintained.

(3) The control device of a vehicle according to (1) or (2), wherein the threshold value setting unit sets a relatively great value as the transition threshold value when the maximum output of the power storage device is relatively great, and sets a relatively small value as the transition threshold value when the maximum output of the power storage device is relatively small.

According to (3), when the maximum output of the power storage device is relatively great, the transition threshold value is set to the relatively great value, and when the maximum output of the power storage device is relatively small, the transition threshold value is set to the relatively small value. Therefore, in a situation where a sufficient output is obtained from the power storage device, it is possible to increase an opportunity to cause the vehicle to travel in the first traveling mode.

(4) The control device of a vehicle according to any one of (1) to (3), wherein the traveling mode control unit is configured to, when the traveling mode of the vehicle is set to the first traveling mode and the vehicle is traveling by the power output from the internal combustion engine and the power output from the electric motor in accordance with the electric power supplied from the power storage device, shift the traveling mode of the vehicle to the second traveling mode based on the detection result of the detection unit and the transition threshold value set by the threshold value setting unit.

According to (4), when the traveling mode of the vehicle is set to the first traveling mode and the vehicle is traveling by the power output from the internal combustion engine and the power output from the electric motor in accordance with the electric power supplied from the power storage device, the traveling mode of the vehicle is shifted to the second traveling mode based on the detection result of the detection unit and the transition threshold value, so that in a situation where the driving force of the vehicle can significantly decrease when the output of the power storage device decreases, the traveling mode of the vehicle can be shifted to the second traveling mode.

What is claimed is:

1. A control device of a vehicle that controls the vehicle capable of traveling according to a plurality of traveling modes,
    the plurality of traveling modes including:
        a first traveling mode in which a driving wheel of the vehicle is capable of being driven by power output from an internal combustion engine and power output from an electric motor in accordance with electric power supplied from a power storage device; and
        a second traveling mode in which the driving wheel is capable of being driven by the power output from the electric motor in accordance with electric power supplied from a generator that generates electric power using the power of the internal combustion engine,
    the control device of a vehicle comprising:
        a traveling mode control unit configured to
            cause the vehicle to travel according to any one of the plurality of traveling modes,
            derive an output of the power storage device based on inter-terminal voltage and output current of the power storage device, when the traveling mode of the vehicle is set to the first traveling mode, and
            shift the traveling mode of the vehicle to the second traveling mode based on a comparison between the derived output of the power storage device and a predetermined transition threshold value,
        wherein traveling mode control unit includes a threshold value setting unit configured to set the predetermined transition threshold value, and
        wherein the threshold value setting unit is further configured to change a value of the predetermined transition threshold value in accordance with a maximum output of the power storage device derived based on the output of the power storage device.

2. The control device of a vehicle according to claim 1, wherein the traveling mode control unit is further configured to, when the traveling mode of the vehicle is set to the first traveling mode, shift the traveling mode of the vehicle to the second traveling mode in a case where the output of the power storage device exceeds the predetermined transition threshold value set by the threshold value setting unit.

3. The control device of a vehicle according to claim 1, wherein the threshold value setting unit is further configured to set a relatively great value as the predetermined transition threshold value when the maximum output of the power storage device is relatively great, and § g a relatively small value as the predetermined transition threshold value when the maximum output of the power storage device is relatively small.

4. The control device of a vehicle according to claim 1, wherein the traveling mode control unit is further configured to, when the traveling mode of the vehicle is set to the first traveling mode and the vehicle is traveling by the power output from the internal combustion engine and the power output from the electric motor in accordance with the electric power supplied from the power storage device, shift the traveling mode of the vehicle to the second traveling mode based on the comparison between the derived output of the power storage device and the predetermined transition threshold value set by the threshold value setting unit.

5. The control device of a vehicle according to claim 1, further comprising:
    a vehicle information acquisition unit configured to acquire the inter-terminal voltage and the output current of the power storage device,
    wherein the traveling mode control unit is further configured to derive the output of the power storage device based on the inter-terminal voltage and the output current of the power storage device acquired by the vehicle information acquisition unit.

6. The control device of a vehicle according to claim 2, wherein the traveling mode control unit is further configured to, when the traveling mode of the vehicle is set to the first traveling mode, maintain the traveling mode in the first traveling mode in a case where the output of the power storage device does not exceed the predetermined transition threshold value set by the threshold value setting unit.

7. A control device of a vehicle that controls the vehicle capable of traveling according to a plurality of traveling modes,
    the plurality of traveling modes including:
        a first traveling mode in which a driving wheel of the vehicle is capable of being driven by power output from an internal combustion engine and power output from an electric motor in accordance with electric power supplied from a power storage device; and
        a second traveling mode in which the driving wheel is capable of being driven by the power output from the electric motor in accordance with electric power supplied from a generator that generates electric power using the power of the internal combustion engine,
    the control device of a vehicle comprising:
        a traveling mode control unit configured to
            cause the vehicle to travel according to any one of the plurality of traveling modes,
            derive an output of the power storage device based on inter-terminal voltage and output current of the power storage device, when the traveling mode of the vehicle is set to the first traveling mode, and
            shift the traveling mode of the vehicle to the second traveling mode based on a comparison between the derived output of the power storage device and a predetermined transition threshold value, wherein the traveling mode control unit includes a threshold value setting unit configured to set the predetermined transition threshold value,
wherein the threshold value setting unit is further configured to change a value of the predetermined transition threshold value in accordance with a maximum output of the power storage device derived based on the output of the power storage device, and
wherein the traveling mode control unit and the threshold value setting unit are each implemented via at least one processor.

\* \* \* \* \*